June 5, 1962 R. C. ZELLER 3,037,826
TRUNNION BEARING
Filed Sept. 29, 1959
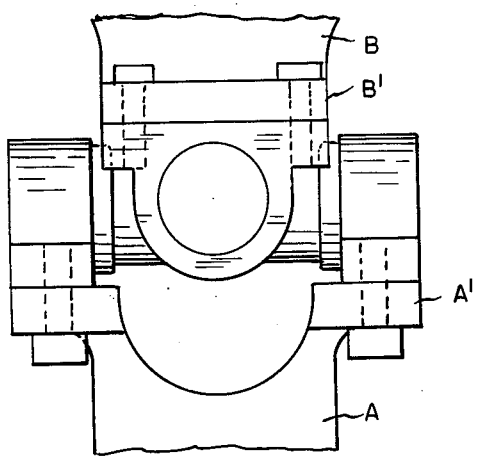
FIG.1.
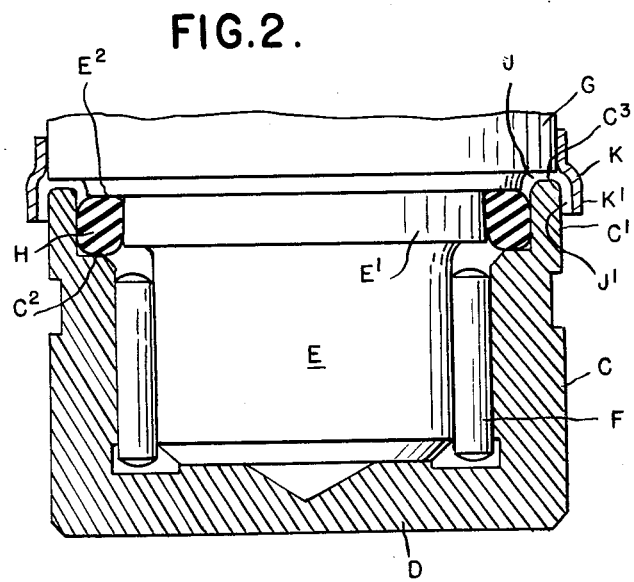
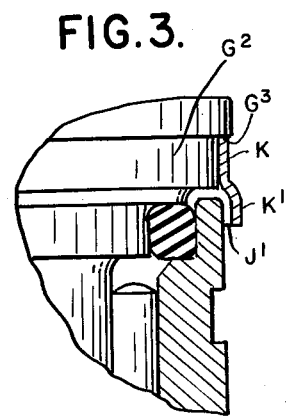
*INVENTOR.*
ROBERT C. ZELLER
BY Whittemore, Hulbert & Belknap
ATTORNEYS 3,037,826
TRUNNION BEARING
Robert C. Zeller, Defiance, Ohio, assignor to The Zeller Corporation, Defiance, Ohio, a corporation of Ohio
Filed Sept. 29, 1959, Ser. No. 843,274
4 Claims. (Cl. 308—187.1)

The invention relates to sealing means for trunnion bearings and is an improvement in the construction of my copending application, Serial No. 545,473, filed November 7, 1955, now Patent No. 2,915,344. It is the object of the present invention to enhance the ability to exclude entrance of dust or grit into contact with the bearing surfaces and also to provide a safeguard against the loss of the resilient sealing ring under certain abnormal conditions. Since the general arrangement of parts in the trunnion bearing of my parent application is very satisfactory, my improved construction follows the same general design with only such changes and modifications as are necessary to achieve the improved results and additional functions.

In the accompanying drawings:

FIG. 1 is a side elevation of a universal joint of the trunnion type.

FIG. 2 is a longitudinal section through one of the trunnion bearings.

FIG. 3 is a partial section similar to FIG. 2 showing a modified construction.

In FIG. 1 there is illustrated a well known type of universal joint having the shaft members A and B, each terminating in yokes $A^1$ and $B^1$ forming opposite trunnion bearings. Each of these bearings C has a closed outer end D and is adapted to receive a trunnion E and a needle or other anti-friction bearing F surrounding the same. The trunnion E projects radially outward from a cross member G in planes which are at right angles to each other. The sealing means is applied to each trunnion bearing in an inward extension thereof beyond the radial thrust receiving portion. It comprises an annular portion C' on the bearing and a portion E' on the trunnion, said portions being radially offset from the thrust bearing portions and the sealing ring H is placed between these portions.

As shown in FIG. 2, the portion E' on the trunnion has adjacent thereto a shoulder $E^2$ which is spaced from and opposite a shoulder $C^2$ on the bearing C. The portion C' of the bearing extends slightly beyond the shoulder $E^2$ with only working clearance therebetween. Thus, there is formed a substantially closed annular space between the concentric portions E' and C' and the shoulders $E^2$ and $C^2$. The sealing ring H is preferably one of the so-called O-ring type. This is normally circular in cross section, the diameter of which is somewhat greater than the space between the concentric portions E', C' and the shoulders $E^2$, $C^2$. Consequently when this ring is placed within the annular space it is deformed to have effective sealing contact with each of these surfaces.

The annular wall portion C' extends beyond the sealing ring H for a sufficient distance to conceal and protect the ring but it is necessarily slightly spaced from the cross member G. This annular space J is between the end $C^3$ of the annular wall and the concavely rounded shoulder G' of the cross member G. A metal ring K is attached to the cross member G by a press fit. It has a flaring extension K' surrounding the annular wall C' and overlapping and spaced from the same by an annular space J' of about the same width as the space J. The surrounding ring K forms a dust shield and cooperates with the adjacent parts to conceal and protect the bearing ring H. Furthermore, the ring K effectively prevents the remote possibility that under high pressure lubrication, the resilient ring H might be blown out through the annular passage J.

In the modified construction illustrated in FIG. 3, the metal ring K has a press fit with the outer wall $G^2$ of the cross member G. The wall $G^2$ is slightly reduced in diameter to form a shoulder $G^3$ forming an abutment for the ring K. The flaring extension K' surrounds the annular wall C' in the same manner as illustrated in FIG. 2.

What I claim as my invention is:

1. A trunnion, a bearing therefor closed at its outer end and having a radial thrust transmitting portion, spaced concentric portions at the inner end of said trunnion and bearing beyond and radially offset from said radial thrust transmitting portion, spaced end shoulders on said trunnion and bearing respectively, forming with said spaced concentric portions a substantially closed annular channel, a resilient sealing ring of the O-ring type within said channel, the undeformed circular periphery of the cross section of said O-ring being greater in diameter than the space between said end shoulders but being of an area less than that of said channel, said concentric portion of the trunnion having an integral portion extending beyond said end shoulder of said trunnion in close proximity to the adjacent portion of said bearing forming an annular space of narrow width, said integral portion having an outer cylindrical surface of approximately the same diameter as the outer cylindrical surface of said bearing, and an annular ring on said trunnion secured to said outer cylindrical surface and having a flaring extension overlapping said bearing.

2. A trunnion, a bearing therefor closed at its outer end and having a cylindrical inner surface, antifriction rollers between said trunnion and said cylindrical surface, the open end of said bearing having an integral portion extending axially beyond said rollers forming an inner cylindrical surface of greater diameter than said roller-engaging surface and also forming an adjacent annular shoulder, said trunnion having an enlarged portion beyond said rollers forming an outer cylindrical surface opposite said integral portion of diameter approximating the diameter of the roller-engaging surface of said bearing, said trunnion having an adjacent annular shoulder opposite said bearing shoulder and within the cylindrical surface of said integral portion, said shoulders and said cylindrical surfaces forming a substantially closed annular channel rectangular in cross section, a resilient sealing ring of the O-ring type within said channel, the undeformed circular periphery of the cross section of said O-ring being greater in diameter than the space between said end shoulders but being of an area less than that of said channel, said integral portion of the bearing extending beyond said annular shoulder of the trunnion in close proximity to said trunnion forming an annular space therebetween of narrow width, said integral portion having an outer cylindrical surface of approximately the same diameter as the adjacent outer cylindrical surface of the trunnion, and an annular ring on said trunnion secured to said outer cylindrical portion and extending beyond said integral portion of the bearing forming an annular space of narrow width communicating with said first mentioned annular space, said annular ring thereby overlapping said bearing.

3. The construction as set forth in claim 1 in which said annular ring engages an annular wall of said trunnion which is of reduced diameter forming a shoulder for the end of said ring.

4. The construction as set forth in claim 2 in which said annular ring has a press fit with said trunnion engaging an annular wall of said trunnion of reduced diameter, said ring engaging a shoulder at the end of said reduced diameter.

References Cited in the file of this patent

UNITED STATES PATENTS

| | | |
|---|---|---|
| 2,113,998 | Swenson | Apr. 12, 1938 |
| 2,915,344 | Zeller | Dec. 1, 1959 |

FOREIGN PATENTS

| | | |
|---|---|---|
| 691,079 | Great Britain | May 6, 1953 |